(Model.)
S. ARNOLD.
MANUFACTURE OF KNIT GOODS.
No. 278,486. Patented May 29, 1883.
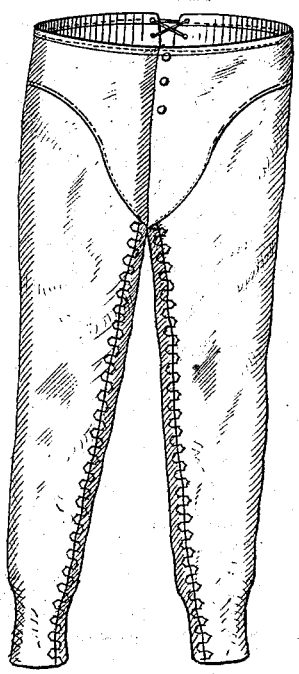
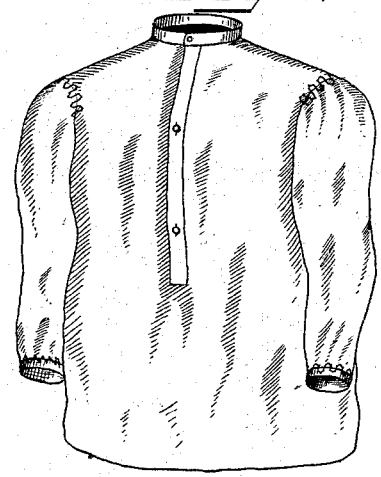
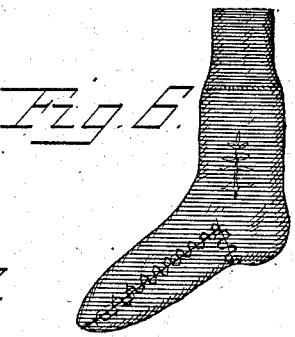
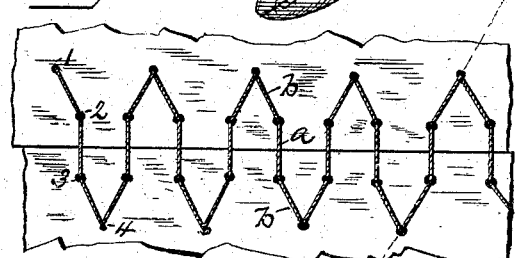
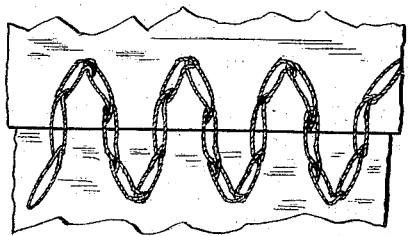
WITNESSES
Franck L. Ourand
George U. Rose Jr.
INVENTOR
Satterlee Arnold
by Heylmun & Kane
Attorneys

UNITED STATES PATENT OFFICE.

SATTERLEE ARNOLD, OF NEW YORK, N. Y., ASSIGNOR TO ANNA M. ARNOLD, OF SAME PLACE.

MANUFACTURE OF KNIT GOODS.

SPECIFICATION forming part of Letters Patent No. 278,486, dated May 29, 1883.

Application filed April 24, 1882. (Specimens.)

*To all whom it may concern:*

Be it known that I, SATTERLEE ARNOLD, a citizen of the United States of America, residing at New York, in the county of New York and State of New York, have invented certain new and useful Improvements in the Manufacture of Knit Goods; and I do hereby declare the following to be a full, clear, and exact description of the invention, such as will enable others skilled in the art to which it appertains to make and use the same.

My invention relates to a new method of manufacturing ordinary articles of wearing-apparel of knit fabrics, known to the trade as "knit goods," but may be also usefully applied in connection with other fabrics and goods.

The special object of my invention is to produce an improved manufacture of knit goods by uniting their adjacent abutting cut edges in an improved manner, so as to form what I term "seamless cut goods" or ordinary articles of apparel, the parts of which have raw or cut edges, as distinguished from selvage edges, and yet are united smoothly without a seam-ridge.

Prior to my invention two principal classes of knit goods have been made and placed upon the market—to wit, "fashioned" goods and "cut" goods. The fashioned goods are formed with selvage edges which allow of their being smoothly joined by ordinary overseaming-stitches, either by hand or machine, without appreciable seams or ridges, and these goods are sold at high prices. The cut goods are joined by lapping the edges and then uniting them by a row of chain-stitches necessarily formed some distance from the edges in order to secure sufficient strength or hold to prevent the stitches from pulling out. This unavoidably causes large and objectionable seam-ridges, and hence these cut goods are inferior and have to be sold at about half the price of full fashioned goods of the same quality. By my invention I completely remove the objectionable seam-ridge in the cut goods and at the same time secure such strength and elasticity of union of the raw edges that my improved goods possess substantially the same qualities as the seamless or fashioned goods, and can be sold at a small per cent. above the price of the common defective seamed cut goods, because the expense of making selvage edges to avoid seam-ridges, as in fashioned goods, is saved.

My invention therefore consists in the method hereinafter set forth in detail of uniting the edges of cut goods so as to avoid the ridge in the seam—that is to say, in abutting them by overseaming and peculiar anchoring or auxiliary stitches.

My invention also consists in the combination, with two pieces of cut knit goods having their edges abutted, of a series of overseaming and anchoring stitches, the latter being at a greater distance than the former from the adjacent abutted edges.

In the annexed drawings, forming a part of this specification, Figure 1 is a top view of two pieces of knit fabric with the edges abutting, showing a portion and the character of the stitches on an enlarged scale. Fig. 2 is an under side view of the same, showing the opposite side of the stitches on an enlarged scale. Fig. 3 is a sectional view taken through the line $x\ x$ of Fig. 1. Figs. 4, 5, and 6 are views of an undershirt, a pair of drawers, and hose of the knit class, made with my improved stitches, the stitches being shown on enlarged scale.

In carrying out my invention I prefer to employ a sewing-machine of my own invention, the needle of which has a pendulous or lateral motion to make four punctures and three stitches in the transverse or lateral path of the sewing while the feeding device moves the material longitudinally, for which machine a separate application for a patent is pending in the United States Patent Office, filed February 10, 1881, Serial No. 25,813. In this connection I desire to remark that I wish it distinctly understood that I reserve the right to employ any other machine capable of making this novel stitch, and that the manufacture of the goods is not dependent upon my special machine.

The materials to be sewed are placed under the presser-foot by abutting their cut edges, and the needle punctures the material a short distance from one edge at 1. The materials are then moved together forward slightly by the feed-motion, then in the meantime the needle moves sidewise and punctures the same piece a second time at 2, between the first puncture and the edge, making from the first to the second puncture what I term an "anchor" or "auxiliary" stitch. The needle is then moved still farther sidewise across the line of division of the parts until it has passed over the edges of the abutting materials, when it descends to make puncture 3 in the other or adjacent piece, and form a stitch from the second to the third puncture, which I term the "uniting" or "overseaming" stitch, from the fact that it crosses the line of division and unites the materials. Then the materials are again moved forward slightly by the feed-motion and the needle moved still farther sidewise and punctures the material at 4, beyond the edge and puncture 3, and forms another anchoring or auxiliary stitch, thus finishing a short line of three stitches, the first and third being anchoring or auxiliary stitches for reenforcing or binding the uniting or overseaming stitch to the body of the materials. The needle then rises and moves laterally in the contrary direction to its previous lateral movement to begin the formation of a second short line of similar stitches in substantially the same manner, thus making two short lines of stitches both extending across the edges of the materials, one crossing from right to left and the other reversely from left to right, as seen in Figs. 1, 2, and 3, both lines of stitches being connected together and both having two uniting or overseaming stitches to confine the loose filaments or threads tightly in place, and both having four auxiliary stitches to firmly anchor the uniting-stitches to the body of the fabric. The machine then repeats the stitches as just set forth, and a continuation of such motions of the needle will result in a line of sewing being formed, made up of a series of diagonal anchoring-stitches uniting stitches on both sides of the fabric across the edges and approximately at right angles to the said edges, substantially as seen in Figs. 1 and 2 of the drawings, in which the letter $a$ represents the uniting or overseaming stitches, and $b$ the anchoring or auxiliary stitches. The anchoring-stitch is that in which one of the punctures is at a greater distance than the other from the edge of the fabric. The seams of cut knit goods — for example, undershirts, drawers, and hose—having their edges united by these compound stitches will have no ridges or welts, and the goods will be what is ordinarily termed "seamless," and the seams will be of great stength and elasticity.

It will be observed that my improved knit goods are produced by the mechanical organization or combination in a novel and useful relation to each other of the parts or elements which make up the goods as specified—to wit, first, the abutting raw or cut edges of knit fabric; second, the overseaming-stitches; third, the farther-reaching auxiliary or anchoring stitches. By these elements brought together or combined in the peculiar manner of my invention the marked utility of my improvement is secured in the structure or make up of my goods as compared with the cognate structure or make up of other knit garments.

What I claim as my invention, and desire to secure by Letters Patent, is—

1. The improvement in the art of uniting fabrics which consists in abutting the edges of the material, then forming an anchoring-stitch in the fabric at one side of said edges, next forming an overseaming-stitch across the line of union and nearer the abutted edges than said anchoring-stitch, and finally forming an anchoring-stitch in the fabric farther from the abutted edges than the overseaming-stitch, substantially as set forth.

2. The combination, with two pieces of cut knit goods having their edges abutted, of a series of overseaming and anchoring stitches, the latter being at a greater distance than the former from the adjacent abutted edges, substantially as described.

In testimony whereof I affix my signature in presence of witnesses.

SATTERLEE ARNOLD.

Witnesses:
 W. H. L. LEE,
 R. A. PIPER.